Aug. 10, 1926.
L. WALLACH
1,595,840
DOLL HAND AND BOTTLE
Filed Feb. 4, 1926
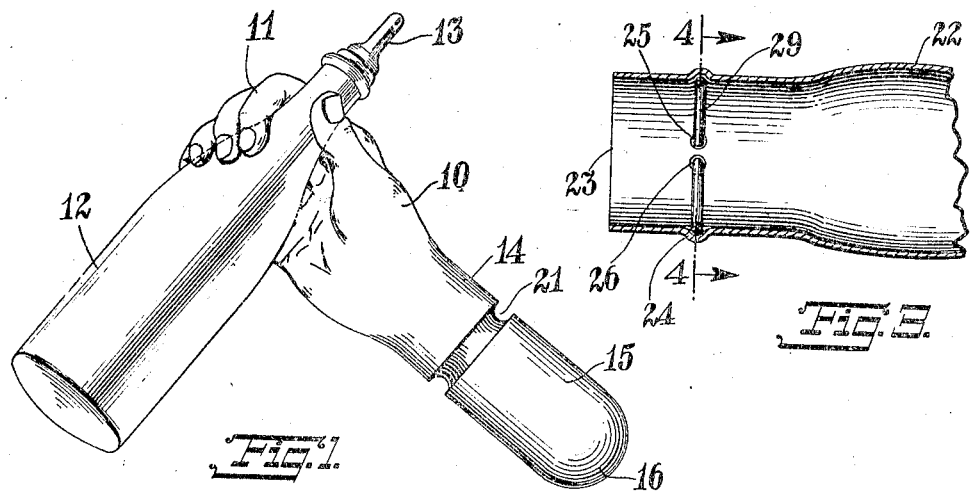
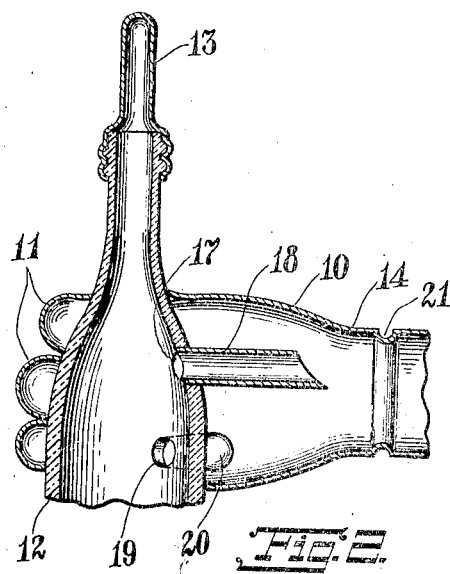
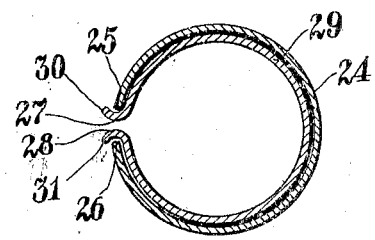
INVENTOR
Leon Wallach
BY
ATTORNEY Patented Aug. 10, 1926.

1,595,840

UNITED STATES PATENT OFFICE.

LEON WALLACH, OF BROOKLYN, NEW YORK.

DOLL HAND AND BOTTLE.

Application filed February 4, 1926. Serial No. 85,909.

This invention relates generally to dolls such as used by children as playthings, the invention having more particular reference to a novel type of removable hand.

The invention has for an object the provision of a removable hand and nursing bottle combined, comprising an effect which will appear as though the doll, to which same is applied, was drinking milk.

A further object of the invention is the provision of a removable hand and nursing bottle combined of novel construction and arrangement of parts.

For further comprehension of the invention, and of the objects and advantages thereof, reference will be had to the following description and accompanying drawing, and to the appended claims in which the various novel features of the invention are more particularly set forth.

Fig. 1 of the drawing, is a perspective view of my improved doll's hand and nursing bottle.

Fig. 2 is an enlarged fragmentary vertical central sectional view thereof.

Fig. 3 is a fragmentary longitudinal central sectional view of a doll's arm adapted to receive my improved device.

Fig. 4 is a vertical sectional view taken on the line 4—4 of Fig. 3.

As here embodied my improved doll's hand and nursing bottle comprises briefly a doll's hand 10, having its fingers 11, molded or otherwise formed in a semi-closed or grasping position, so as to hold the nursing bottle 12 having a removable nipple 13, as clearly shown in Fig. 1, of the accompanying drawing.

The doll's hand 11 has a depending wrist element 14, with an extended portion 15, of circular hollow cross section provided with a circumferential notch 21 or groove, suitably located, the said extended portion 15 having a rounded closed end 16. It is understood that the above mentioned doll's hand and connected elements are molded or suitably formed hollow, as is also the nursing bottle 12, as clearly shown in the accompanying drawing.

The nursing bottle 12 is provided with an aperture 17, to receive the hollow cylindrical member 18, or tube, which is suitably attached to the nursing bottle 12, at one extremity, and which extends therefrom into the doll's hand 10, the said tube 18 being positioned at or near the upper portion of the doll's hand 10.

The nursing bottle 12 is also provided with an aperture 19, intercommunicative with the doll's hand 10, as at 20.

The above mentioned construction being such as will allow milk, or any liquid, preferably a mixture of water and any white ingredient, to represent milk, when poured or placed in the said nursing bottle, by removing the nipple 13, to run through the said apertures 17 and 19 into the doll's hand, when the arm, to which my improved device is attached is inclined, or bent upwards, to the doll's mouth, and which will permit the said milk to run from the said doll's hand, through the aperture 19 back into the said nursing bottle 12, when the said doll's hand is bent back into its initial position. It is understood, that the aperture 19 will be of comparatively small area, as, compared to the area of the said aperture 17. When the device is tilted upwardly the liquid flows through both apertures 17 and 19 from the bottle into the hand, appearing as though the doll quickly drinks the liquid. But when the device is lowered into its normal downward position, the return of the liquid from the arm to the bottle is very slow and gradual, due to the fact that aperture 17 is above the liquid level, and the liquid must return through aperture 19, which is of such a size compared to aperture 17 as to cause a very slow return of the liquid. It is further understood that the said nursing bottle 12 is made of any suitable transparent material, and that the said doll's hand 10, is made of any suitable opaque material.

Referring in particular to Figs. 3 and 4, in which I have shown the doll's arm adapted to receive my improved device. The doll's arm 22, is of hollow circular cross section, having an open lower extremity 23, and provided with a circumferential raised curved portion 24, having apertures 25 and 26, adapted to receive the extremities 27 and 28, respectively of a suitably round spring member 29, the said extremities 27 and 28, being formed or bent as at 30 and 31, respectively, to retain the said spring 29, in the desired position.

The above construction being such as will allow the spring 29 to engage the said notch 21, when my improved device is pushed or slid into the doll's arm 22, it being understood that the said rounded closed end 16 will force the spring 29 into the raised curved portion 24, until my improved device is in a fully engaged position, at which time, the said spring 29 will engage the notch 21.

It will be further understood that my improved device may be made without the embodiment of the said notch 21, and the said raised curved portion 24, and the said related spring 29.

Having thus described my invention, what I claim as new and desire to protect by Letters Patent of the United States is as follows:—

1. A device of the class described, comprising a nursing bottle, a doll's hand fixed to said bottle, a tube extending from the bottle into the doll's hand, said tube being positioned near the upper end of said hand, and said bottle being formed with an aperture intercommunicating with the doll's hand, said aperture being positioned below said tube and permitting the slow and gradual return of the liquid when the bottle is lowered to its initial position.

2. A device of the class described, comprising a nursing bottle, a doll's hand fixed to said bottle, a wrist element depending from said hand, a circular hollow member formed with a circumferential notch, depending from said wrist element, a doll's arm formed with a circumferential raised curved portion, said doll's arm being formed with apertures in said raised curved portion, a round spring member housed in said raised curved portion, and engageable with the circumferential notch of said circular hollow member, said spring member having its ends engaged in the apertures of said doll's arm, a tube extending from the bottle into the doll's hand, said tube being positioned near the upper end of said hand, and said bottle being formed with an aperture intercommunicating with the doll's hand, said aperture being positioned below said tube and permitting the slow and gradual return of the liquid when the bottle is lowered to its initial position.

In testimony whereof I have affixed my signature.

LEON WALLACH.